United States Patent [19]

Hofmann

[11] Patent Number: 5,396,233
[45] Date of Patent: Mar. 7, 1995

[54] ARRANGEMENT FOR IDENTIFYING MOTOR VEHICLES

[76] Inventor: Wilhelm H. Hofmann, Hubertusstrasse 3, D-6390 Usingen, Germany

[21] Appl. No.: 930,518
[22] PCT Filed: Jan. 30, 1992
[86] PCT No.: PCT/EP92/00195
§ 371 Date: Oct. 1, 1992
§ 102(e) Date: Oct. 1, 1992
[87] PCT Pub. No.: WO92/13737
PCT Pub. Date: Aug. 20, 1992

[30] Foreign Application Priority Data

Feb. 4, 1991 [DE] Germany .................. 41 03 267.5

[51] Int. Cl.⁶ ............................................. G08G 1/01
[52] U.S. Cl. ............................. 340/933; 235/384; 340/905; 340/928
[58] Field of Search ............ 340/932.2, 933, 928, 340/905, 901; 364/424.01, 424.04, 436; 307/10.5; 235/384; 180/287

[56] References Cited

U.S. PATENT DOCUMENTS

| | | | |
|---|---|---|---|
| 4,591,823 | 5/1986 | Horvat | 340/905 |
| 4,805,722 | 2/1989 | Keating et al. | |
| 4,982,072 | 1/1991 | Takigami | 235/384 |
| 5,101,200 | 3/1992 | Swett | 340/928 |
| 5,196,846 | 3/1993 | Brockelsby et al. | 340/933 |
| 5,204,675 | 4/1993 | Sekine | 340/928 |

FOREIGN PATENT DOCUMENTS

| | | | |
|---|---|---|---|
| 0402821 | 12/1990 | European Pat. Off. | 235/384 |
| 282148 | 5/1987 | Japan . | |
| 178049 | 10/1989 | Japan . | |
| 0054393 | 2/1990 | Japan | 340/928 |
| 2152720 | 8/1985 | United Kingdom | 235/384 |
| 2217885 | 1/1989 | United Kingdom . | |

Primary Examiner—Brent Swarthout
Attorney, Agent, or Firm—Anderson Kill Olick & Oshinsky

[57] ABSTRACT

The invention is directed to an arrangement for the identification, central registration and checking of motor vehicles. At least one electronic identification plate (2, 3) which is securely connected by mechanical means with the motor vehicle (1) and connected to an on-board computer (15) in the motor vehicle (1) comprising a reader (16) for data carriers (49-52) is associated with every motor vehicle (1). The coding of the data carriers can be established, read, modified and registered by a central computer (43) and is required for switching on and off at least the electronic identification plates (2, 3) of the motor vehicle (1).

2 Claims, 5 Drawing Sheets

ARRANGEMENT FOR IDENTIFYING MOTOR VEHICLES

FIELD OF THE INVENTION

The invention is directed to an arrangement for the identification, central registration and checking of motor vehicles.

BACKGROUND OF THE INVENTION

As a rule, license plates of sheet metal bearing the identification in the form of embossed numerals and/or letters have been used up to the present to identify a motor vehicle. Such license plates can be attached to passenger vehicles, motorcycles, trucks and other road vehicles.

The size and arrangement of the plates on the respective motor vehicle are prescribed. The type of numerals and letters, the coloring of these markings and of the background are likewise established according to national laws and regulations. It is also required by law that motor vehicles carry additional identifying markings for the nationality of the licensing country.

A motor vehicle registration certificate and licensing voucher are also necessary for further identification of motor vehicles. While license plates only carry numbers and/or letters which together enable a quick identification of the owner, they also lead to other data concerning the motor vehicle which are stored in the relevant police station, licensing bureau or central facility, e.g. in Flensburg in the former Federal Republic of Germany.

Such comprehensive registration of motor vehicles is handled in more or less the same way in all countries.

There is no doubt that this registration of motor vehicles is costly and troublesome. The sheet-metal license plates must be manufactured, which also includes the incorporation of numbers and letters, painting and often also coating with a reflective film. Since the plates are coated chemically in particular, environmentally harmful waste water is generated in the manufacturing plants. Another disadvantage of present means of identification is that they can be produced and changed relatively easily by unauthorized persons.

Considerable expense is required for additional registration of the essential data of the motor vehicle owner and of the motor vehicle itself. The motor vehicle registration certificates and licensing vouchers must also be produced and provided with all the necessary data. As a recent development, this data must also be stored in computers. This involves careful coordination of the production of the license plate and entry of data in the motor vehicle licensing voucher and registration certificate. In addition, the possibility must be kept open for registering a change of ownership or suspension of the motor vehicle.

SUMMARY OF THE INVENTION

In contrast, the object of the invention is to adapt the identification marking, central registration and checking of motor vehicles to modern electronic identification and registration capabilities and in so doing to create extensive obstacles to possible misuse.

This object is met in that at least one electronic identification plate is associated with every motor vehicle, which identification plate which is fixed to the motor vehicle by mechanical connection and connected to an on-board computer in the motor vehicle having reading means for the data carriers whose coding can be established, read, modified and registered by a central computer in conformity to the data of the vehicle, this coding being required for switching on and switching off the electronic identification plate of the motor vehicle.

This arrangement is the basis for a new tamper-proof means for the identification of motor vehicles which is protected against misuse.

It works with a first data carrier which includes additional storage space for receiving codes for the identifying data of an "authorized person" and an activating command for fully activating at least one of the electronic identification plates. The "authorized person" can also be an official or employee of the licensing bureau.

The electronic arrangement in the vehicle can be fully switched on by a second data carrier which includes storage space for receiving codes for at least one detection signal, e.g. for switching on an on-board computer in the motor vehicle, in addition to the storage space of the first data carrier.

Additional data carriers can be used in connection with the arrangement according to the invention. Additional storage space for receiving codes for commands to cancel display fields on the identification plates can be included on a third data carrier in addition to storage space for receiving the codes for identifying data of the "authorized person". In addition, the first data carrier can include storage space for receiving codes for control or monitoring data, e.g. HU and/or ASU displays, and or for switching corresponding display elements on the electronic identification plates or of display devices in or on the motor vehicle. Finally, a fourth data carrier can be provided which, in addition to storage space for receiving codes for data concerning the "authorized person", includes storage space for receiving codes for commands for at least partial erasure of the on-board computer and/or central computer or licensing bureau computer.

According to the invention, any desired data carrier can be used. However, it has proven advantageous to use magnetic cards as data carriers.

In particular, all of the vehicle data provided by the manufacturer on currently used motor vehicle registration certificates, e.g. manufacturer, chassis number, official identification, trip number, key number, and ASU, HU (Technical Control board) examinations, are transferred to the first magnetic card.

When the official identification marking is assigned to a vehicle, the data and identity are encoded and stored on the data carrier. This code on the data carrier is then used by the "authorized person" to switch on the identification marking. This card then either passes into the appropriate card file in the licensing bureau and the vehicle owner receives a data carrier which includes only the vehicle data or the like, but not the coding, or in special cases the owner of the motor vehicle receives the complete data carrier.

According to the invention, the on-board computer, central computer or licensing bureau computer and the respective card readers are connected in such a way that an alarm is triggered in the computers by a data carrier whose code is incompatible with the stored data. When magnetic cards are used as data carriers, the card readers are constructed as magnetic card feed-through readers. When the vehicle owner or "authorized person" runs the magnetic card 1 through the card reader of the on-board computer, the electronic identification plates are switched on if the data carrier (magnetic card) matches the motor vehicle. The motor vehicle is then ready to drive.

The on-board computer of the motor vehicle can be connected to a 220 V mains and/or to battery voltage, as desired.

The identification plates have display fields utilizing liquid crystal or LED elements.

The on-board computer and card readers are securely connected to components in the interior of the motor vehicle.

Every identification plate is enclosed by a housing and includes an LED plate made of plastic whose back side is tinted black and whose front is transparent, plain and non-reflecting. Every identification plate includes LED elements which, in addition to the numbers 0 to 9 and letters A to Z, also have special symbols, e.g. Chinese or Japanese characters or the like.

The new electronic identification plates correspond in size to current motor vehicle license plates with a length of 250 mm, a height of 110 mm, and a thickness of approximately 20 to 25 mm. Other sizes may also be used.

The central computer and licensing bureau computer are interconnected via lines and/or radio.

The arrangement according to the invention may also incorporate a control computer with a monitor which is carried e.g. on police squad cars. This control monitor is provided each day with new data on stolen vehicles or wanted persons, e.g. by computer link with the licensing bureau or police. The contents of a data carrier, e.g. a magnetic card, can be displayed in legible form on the monitor so as to successfully support police investigations in many cases. This search method is less costly and complicated than present means of checking persons.

The invention makes it possible to provide lasting or permanent identification markings of vehicles of all types in a switching and working connection with the on-board computer and, via the latter, with a data carrier. Consequently, the identification markings can not be exchanged with others, as was possible with previous identification markings. The identification markings accompany the motor vehicle for the duration of its life. Even if the identification markings were installed in another vehicle, they could not function since they must be activated via the respective on-board computer with the proper data carriers, preferably magnetic cards. The identification markings are therefore practically counterfeit-proof.

This also provides much better protection than before against theft.

Most of the component parts of the arrangement, e.g. on-board computer, licensing bureau computer, central computer, control computer with monitor, data carrier, preferably magnetic cards and magnetic card readers, as well as the links between the computers are known per se. Such individual elements are not the subject matter of the invention.

It is advantageous that the novel identification plates are made of individual elements which are known per se. The manufacture of these new identification plates is far less harmful to the environment than the manufacture of previous license plates with their health-threatening paint. The novel identification plates are not subject to any fading of color. But the fact that the arrangement according to the invention enables quick registration and checking of vehicles and their "authorized persons" is of especial importance.

Embodiment examples of the invention are described in the following with the aid of the drawing.

DESCRIPTION OF THE PREFERRED EMBODIMENT

Figure 1:
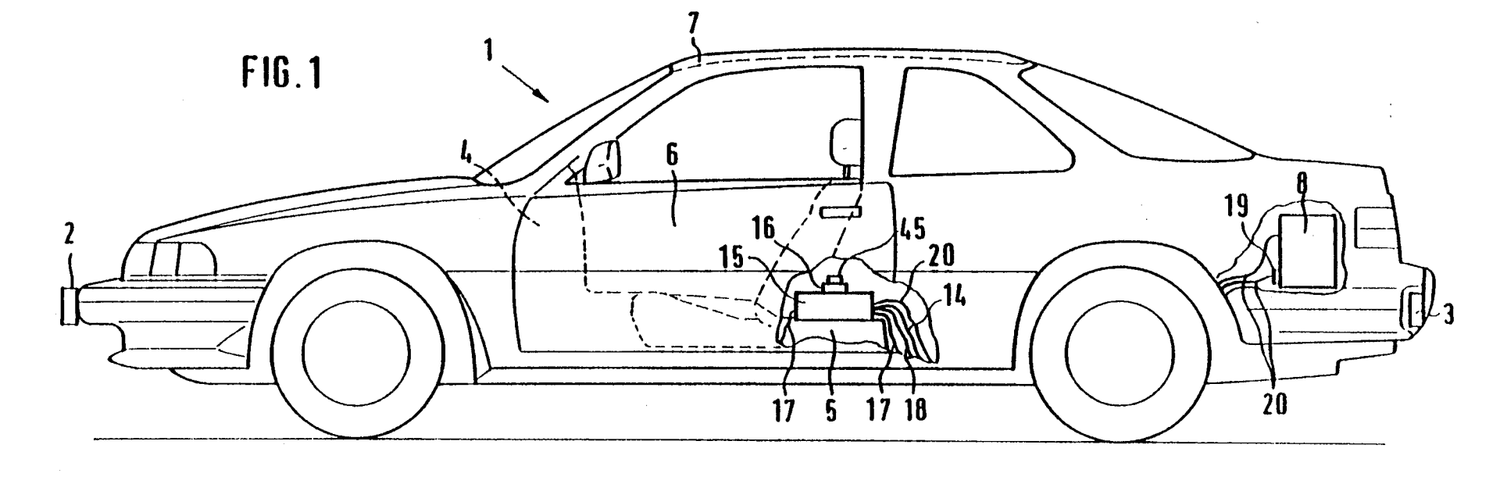
FIG. 1 shows a motor vehicle with a schematic view of the details of the arrangement.

FIG. 1 is a schematic view of a motor vehicle of an optional type whose individual parts are not the subject matter of the invention and are therefore not described in more detail.

The motor vehicle has electronic display markings in a manner to be explained in the following which are activated by a data carrier, e.g. a magnetic card.

A front electronic identification plate 2 and a rear electronic identification plate 3 are arranged on the motor vehicle 1. The arrangement according to the invention is in a switching connection with a power supply part 8 which can be arranged e.g. in the tail end of the motor vehicle, preferably in the luggage compartment, via a cable connection of the motor vehicle, not shown. The power supply part 8 has a battery connection 9 and an external power connection 10 which is indicated only in a schematic manner. The power supply part 8 feeds not only the two electronic identification plates 2 and 3, but also an on-board computer 15 which is arranged in the embodiment example on the center console 5 of the motor vehicle. Without any essential change in the invention the on-board computer 15 can also be arranged behind the dashboard 4, in a door 6, or in some other location within the motor vehicle.

In the embodiment example in the drawing the on-board computer 15 is electrically connected with a feed-through reader 16 for magnetic cards 45. The feed-through reader 16 can be arranged inside the motor vehicle at a conveniently accessible location, e.g. also within the reach of the driver under the roof 7 of the motor vehicle.

Figure 2:
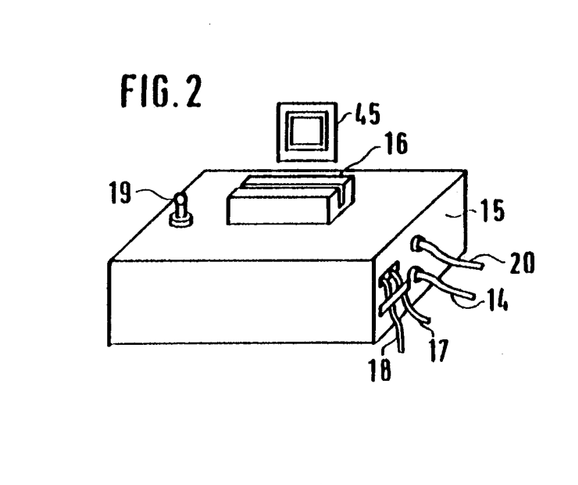
FIG. 2 shows an on-board computer.
Figure 3:
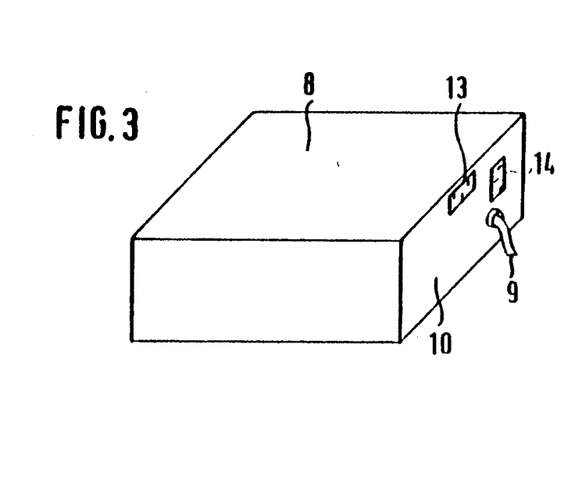
FIG. 3 shows a power supply part.

FIGS. 1, 2 and 3 show that the power supply part 8 has a power supply connection 13 for the background illumination of the electronic identification plates 2 and 3, which are explained in more detail in the following, and a cold-device outlet 14 and that the on-board computer 15 is also provided with a cold-device outlet 14. Feed cables for the front and rear electronic identification plates are designated by 17 and 18, respectively, in FIG. 2. The on-board computer 15 is further provided with a switch 19 for emergency power supply. A power supply cable 20 for the background illumination of the electronic identification plates 2 and 3 also branches off from the on-board computer 15.

Figure 5A:
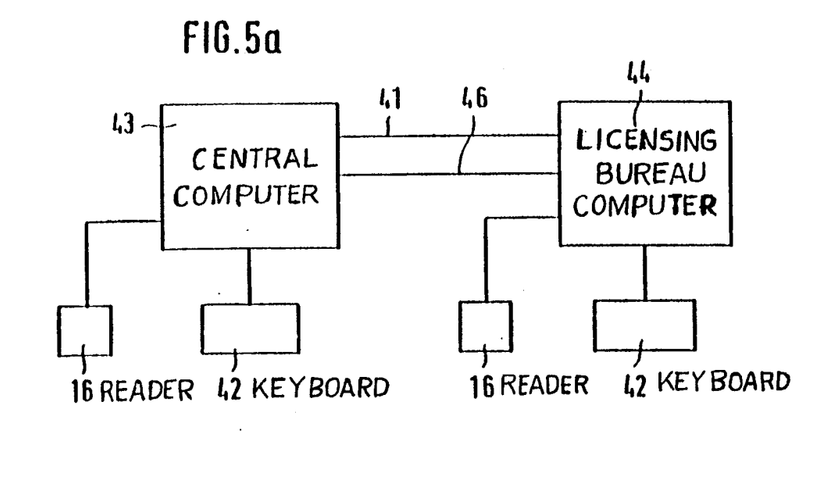
FIG. 5a shows the connection of the licensing bureau computer with the central computer.
Figures 5B, 5C:
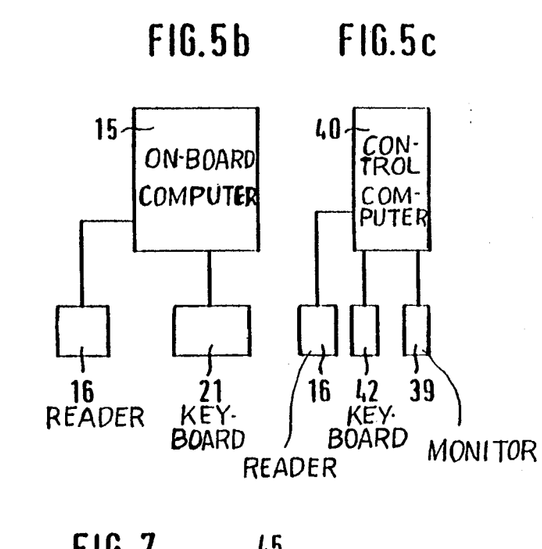
FIG. 5b shows an on-board computer.
FIG. 5c shows a control computer.

As shown in FIG. 5b, the on-board computer 15 is provided with an input keyboard 21, not shown in FIGS. 1 to 3 for the sake of clarity, in addition to the feed-through reader 16.

The above-enumerated individual elements of the arrangement are shown in FIGS. 1 to 3 only by way of example. Depending on the type of vehicle, it may be necessary to provide a different arrangement of these elements. As already mentioned, the power supply part 8 can be operated by the regular vehicle battery in connection with an external power source. However, without any essential modification of the invention, it is also possible to use a special power supply—e.g. in a truck—for the arrangement according to the invention.

If necessary, the power supply part 8 can also be outfitted with a conventional battery buffer.

Figure 4:
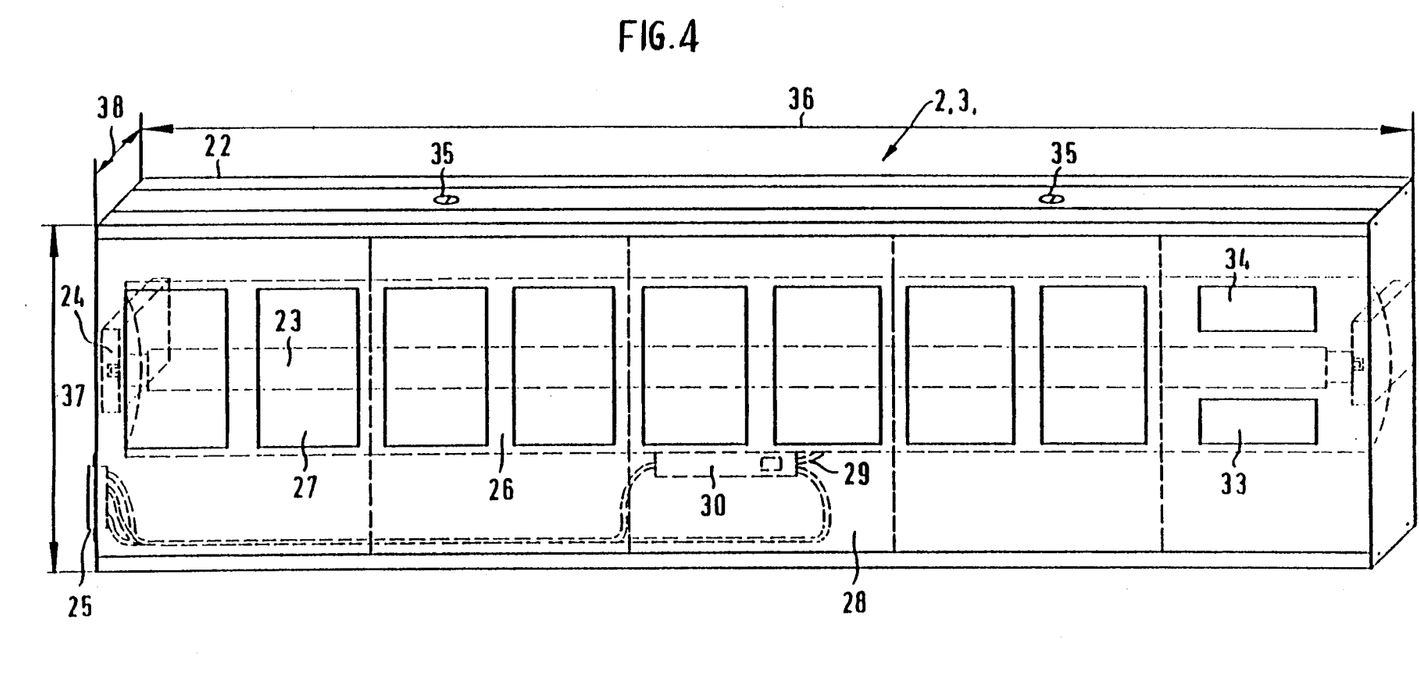
FIG. 4 shows an identification plate.

A front and rear electronic identification plate 2, 3 is shown schematically in FIG. 4. Its length 36, height 37 and thickness 38 correspond to conventional license plate measurements. Thus, the length is approximately 520 mm, the height is approximately 110 mm, and the thickness is approximately 20 to 25 mm. A lighting tube 23 with a reflector 26 used for background illumination of the electronic identification plate 2, 3 is shown in a suitably constructed housing 22. The lighting tube 23 is arranged in lighting tube sockets 24 and is connected with the power supply connection 20 of the background illumination on the on-board computer 15 via a connection plug 25, known per se. In the embodiment example shown in FIG. 4, an electronic identification plate 2, 3 has eight display fields 27 with which it is possible to show e.g. all of the conventional numbers and letters used for license plates in the Federal Republic of Germany. The identification plate shown in FIG. 4 is only an example. According to the invention it is possible to manufacture e.g. all of the license plates in use in different countries according to the regulations in force for vehicle license plates.

According to the invention, for example, two display fields 27 can be combined to form a module 28. These modules facilitate the cable connections 29. A starter 30 is provided inside every identification plate and activates an identification plate based on the signal arranged on a magnetic card or data carrier.

It is advantageous that an identification plate 2, 3 can also be provided with a so-called HU display 33 and ASU display 34. These displays can be activated in a manner to be explained in the following by special data carriers, preferably magnetic cards.

The electronic vehicle plates can be connected to the motor vehicle in an optional manner. In the embodiment example shown in FIG. 4, fastening screws 35 are used. Liquid crystal displays can be used for the display fields 27. Indicator plates or panels at varying levels of integration all the way up to operable systems have long been known. Component groups of modules can also be controlled. The identification plates can be operated via serial interfaces. The software and hardware required for self-contained operation can be set up specifically for the respective application. The identification plates can be manufactured and supplied in every common size with integrated drivers—ICs—so as to be ready for use and framed for installation. Commercially available fluorescent tubes with brightness control can be used for the illumination. Microprocessors and character generators can be used with serial interfaces for control purposes. Liquid crystal lettering, e.g. with 114 elements per character, can be used as text. The display fields can also be supplied with optional colors.

FIG. 5a shows a simplified schematic view of a licensing bureau computer, a central computer, an on-board computer, and a control computer with their interconnection. A central computer 43 is connected with a feed-through reader 16 for magnetic cards and an input keyboard 42. A licensing bureau computer 44 is also outfitted with a feed-through reader 16 and an input keyboard 42. The central computer 43 and the licensing bureau computer 44 are also outfitted with monitors, not shown. The central computer 43, e.g. in the motor vehicle licensing bureau in Flensburg, can be connected with an optional number of licensing bureau computers 44 via lines 46 or radio 41. The two computers can serve to provide data carriers, preferably magnetic cards 45. They are connected with one another in such a way that the data of a magnetic card produced in the central computer 43 are also stored in the respective licensing bureau computer 43. The process can also be reversed.

An on-board computer 15 with an input keyboard 21 and a feed-through reader 16 is installed in every motor vehicle. The required data can be fed into the on-board computer 15 via the input keyboard 21.

FIG. 5c shows a control computer 40 with a monitor 39, an input keyboard 42 and a feed-through reader 16. Such a control computer 40 can be carried in police squad cars for example. Data concerning urgent police operations or, for instance, stolen vehicles can be entered into this computer 40 daily. With respect to vehicle control, the respective magnetic card of the vehicle need only be run through the feed-through reader 16, whereupon the data on the magnetic card are made visible in legible form on the monitor 39. Checking of persons in its present form is made considerably easier in this way.

Figure 6A:
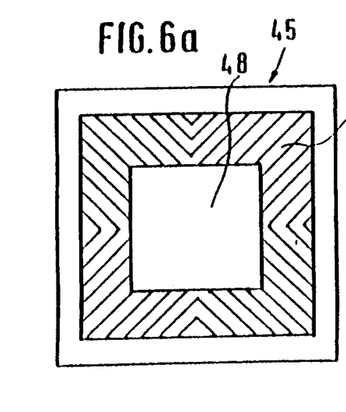
FIG. 6a shows a first embodiment example of a magnetic card.
Figure 6B:
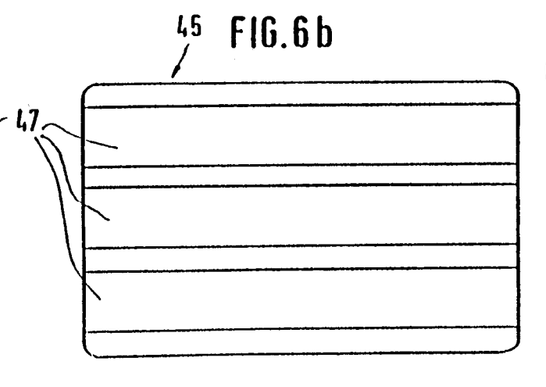
FIG. 6b shows a second embodiment example of a magnetic card.
Figure 7:
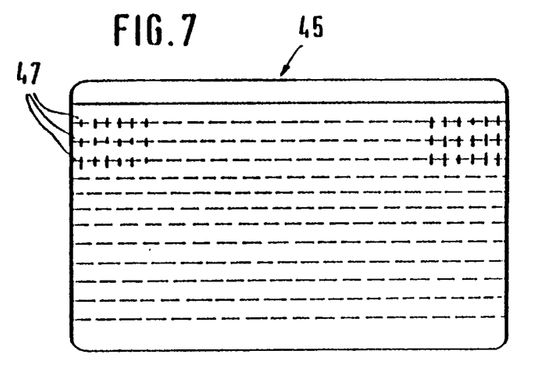
FIG. 7 shows a third embodiment example of a magnetic card.

FIGS. 6 and 7 show examples of magnetic cards as used in connection with the present arrangement. FIG. 6a shows a magnetic card 45 with magnetic tracks 47 in rectangular arrangement enclosing a space 48 for a photograph, e.g. of the motor vehicle owner. The dimensions of the magnetic card 45 shown in FIG. 6a are adapted to the utilized feed-through reader 16.

FIG. 6b shows another magnetic card 45 with magnetic tracks 47 for storing data.

Finally, FIG. 7 shows another embodiment example of a magnetic card 45 with magnetic tracks 47. It goes without saying that all of the above-mentioned magnetic cards are to be used with appropriate feed-through readers.

FIGS. 8 to 15 show four different magnetic cards 49 to 52 which are used in combination with the new arrangement.

Figure 8:
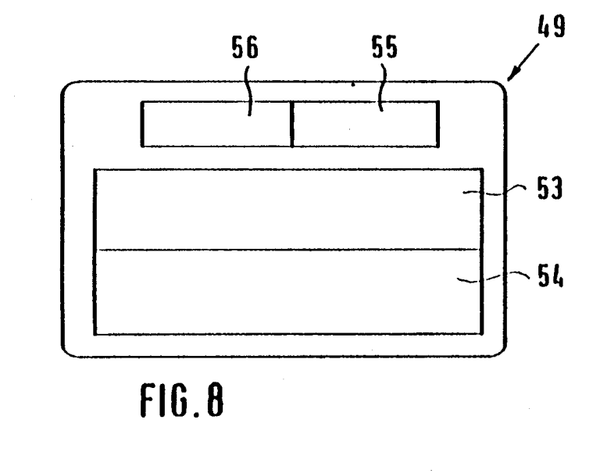
FIG. 8 shows the front side of a first magnetic card.

The first data carrier 49, designed e.g. as a magnetic card, has a storage space 55 for an activating command and a storage space 56 for a detection signal. For example, if the detection signal of the storage space 56 does not match the detection signal stored in the on-board computer an alarm is set off. The arrangement can not be activated. An activation command of the storage space 55 can activate the arrangement, particularly the two electronic identification plates 2 and 3, only when the on-board computer detects the correct detection signal from the space 56.

Further, storage space 53 for vehicle data and storage space 54 for the data of the "authorized person" are stored on the data carrier 49. For example, the vehicle data includes the identification marking, type and model of the vehicle, the manufacturer, number of passenger seats, trailer load or support load. License data as well as space for supplementary or modified technical data can also be provided in this storage space. Name and address, date of birth of the vehicle owner and the number of owners or prior owners are recorded on the storage space 54. The front side of the card shown in FIG. 8 accordingly carries all of the data previously recorded on vehicle registration certificates.

Figure 9:
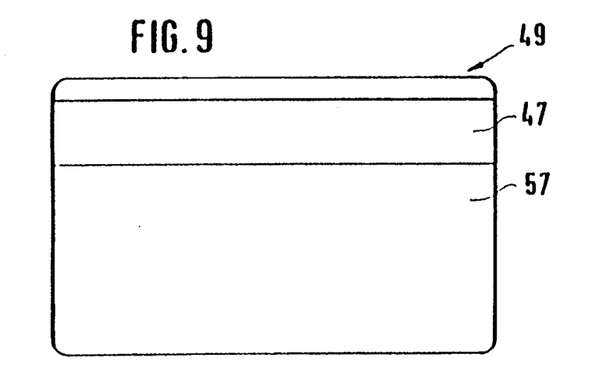
FIG. 9 shows the back side of the magnetic card according to FIG. 8.

FIG. 9 shows the back side of the card 49 shown in FIG. 8. Below the magnetic track 47, which can be made up of three tracks and can serve as storage space 57 for control data, there is space available for data printed in legible form. This legible data is printed by a special printer if necessary. As a rule, the prototype of a magnetic card 49 is not outfitted with this visible data.

Figure 10:
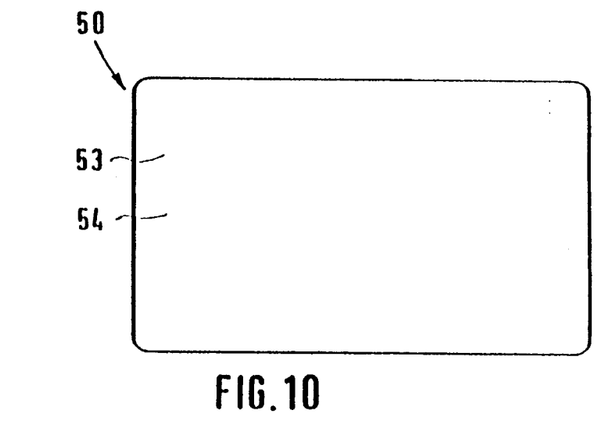
FIG. 10 shows the front side of a second magnetic card.

FIG. 10 shows the front side of the second data carrier 50 in the form of a magnetic card. This front side carries the ASU number, owner data and expiration date of the card broken down according to month and year. This data can be made visible on the monitor 39 e.g. by means of the control computer 40.

Figure 11:
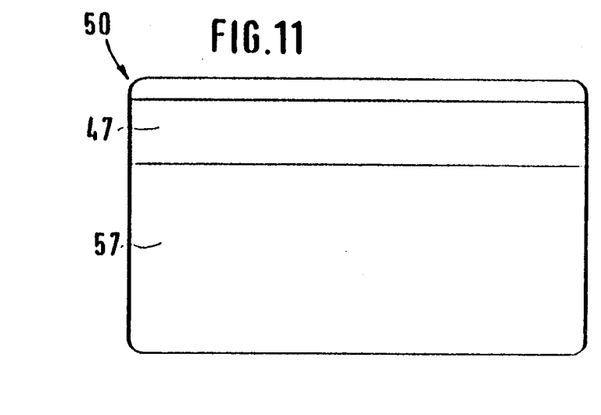
FIG. 11 shows the back side of the magnetic card according to FIG. 10.

FIG. 11 shows the back side of the second data carrier 50. In addition to a magnetic track 47, the back side contains space for the ASU adjustment data. This data can also be displayed e.g. on the monitor 39 of a control computer 40.

Figure 12:
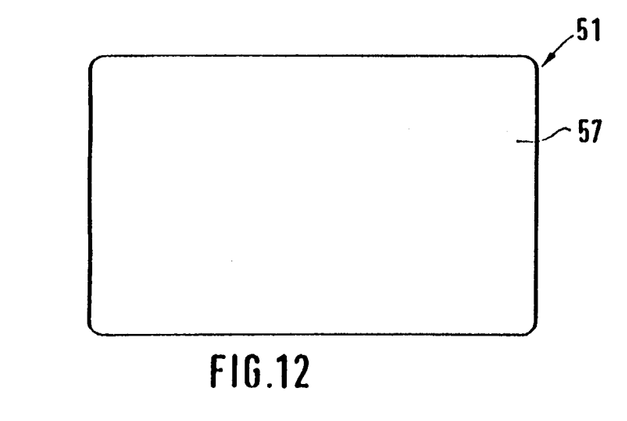
FIG. 12 shows the front side of a third magnetic card.
Figure 13:
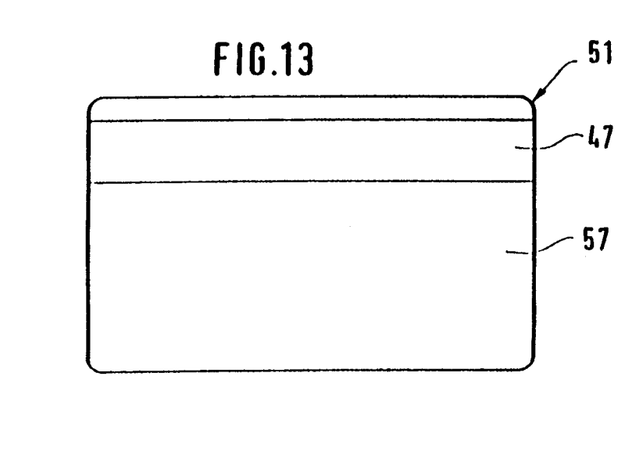
FIG. 13 shows the back side of the magnetic card according to FIG. 12.

The third data carrier 51, whose front side is shown in FIG. 12, contains all data concerning principle examinations. Principle examinations, HU examination numbers, data concerning the authorized person and data on the validity of the card (month and year) are important. The back side of the third card 51 is indicated in FIG. 13. In addition to a magnetic track 47, storage space 57 for control data is provided. A photograph of the authorized person can also be arranged in this location as on the back side of the card shown in FIG. 11.

Figure 14:
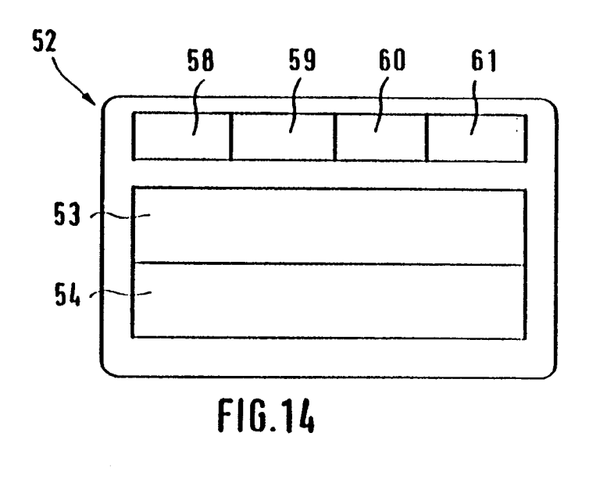
FIG. 14 shows the front side of a fourth magnetic card.
Figure 15:
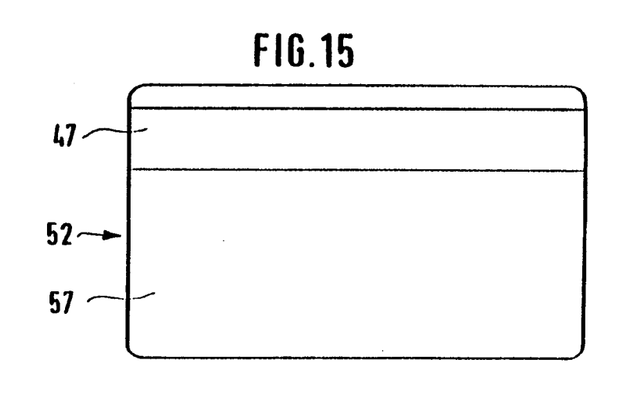
FIG. 15 shows the back side of the magnetic card according to FIG. 14.

Finally, FIGS. 14 and 15 show the front and back sides of a fourth data carrier 52. Storage spaces 58 to 61 are provided for an identification plate deletion command, on-board computer deletion command, licensing bureau deletion command, and a deletion command for the central computer. Moreover, the front side carries storage spaces 53 and 54 for vehicle data and the data concerning the "authorized person".

A magnetic track 47 and a storage space 57 for control data are accommodated on the back side.

The identifications according to the invention are permanent identifications which can also not be exchanged when the owner is changed, since they can only be activated —i.e. altered—with a coded magnetic card on-board computer with feed-through reader.

These permanent identifications can only be changed by destroying them. Since they can only be activated via the on-board computer and accordingly an identification marking determined by the licensing bureau is always assigned to only one vehicle—in which the matching of data between the on-board computer and magnetic card is given.

Forgery and misuse are totally precluded.

Instead of the previous vehicle vouchers and certificates—as the case may be—the vehicle manufacturers also supply four-piece magnetic card sets containing all technical data.

These cards have an additional free magnetic strip which can be inscribed or erased at the time of licensing solely by the licensing bureaus.

Two of these magnetic cards assume the role of the previous vehicle registration certificate and the other two that of the vehicle voucher. One of the two magnetic cards (namely the coded card) is kept by the licensing bureau.

The number of vehicle owners, encoded with alphabetic characters or numbers or special symbols, is contained in the first two cards.

A new owner or change of domicile can be inscribed on these two magnetic cards only by the licensing bureau.

A vehicle is suspended when the vehicle owner surrenders his two magnetic cards to the licensing bureau. There, the number of the official identification on his substitute vehicle certificate card is deleted by means of the code known to the licensing bureau, and with the same card the official identification is deleted by the official authorities through the on-board computer.

After the suspension is recorded in the motor vehicle registration card, the owner's vehicle voucher card is kept by the licensing bureau.

This can be reinstated in case of renewed registration or change of ownership based on the cards available to the owner upon presentation of the owner's registration magnetic card.

Since all licensing bureau computers are linked with the central computer in Flensburg via cables or radio, all data are immediately stored at the time of licensing or suspension.

The ASU display can be signaled or altered with the ASU magnetic card by an ASU-authorized person, including the licensing bureau.

This also applies to the Technical Control Board magnetic cards.

If necessary, confidential reports or logging-off can be effected by the licensing bureau or police with the fourth magnetic card.

The cards are issued and sent as follows:
1. ASU cards by the regional workers associations of the automotive trade and trade corporations,
2. Technical Control Board or HU cards by the Technical Control Board and its branches,
3. Suspension cards through the licensing bureaus.

General traffic control is carried out with stationary or portable control devices with monitor. The police are signaled via the monitor which contains the magnetic card. If there is a reason for checking the data, the official can print out this data by means of a stationary printer in his squad car.

If comparison data are required, the official requests it from the licensing bureau via radio. A comparison of this data with the data on the printed strips can be carried out on site.

The distribution of the electric identifications is carried out by the existing license plate manufacturing stations.

I claim:

1. An arrangement for an identification, a central registration, and a checking of motor vehicles, comprising:

at least one electronic license plate screen which contains at least one of light emitting diode and liquid crystal display elements, wherein said at least one electronic license plate screen is connected to a motor vehicle;

an on-board computer in said motor vehicle, wherein said at least one electronic license plate screen is connected to said on-board computer;

a reading means for data carriers, wherein said data carriers includes a first data carrier having a coding which can be used for switching said at least one electronic license plate screen on and off, wherein said first data carrier is utilized as a switching element and as a component of a motor vehicle registration system, wherein said motor vehicle registration system further comprises:

a central computer, and at least one of a licensing office computer and a checking or monitoring computer in a designated official vehicle, wherein said central computer, said licensing office computer, said checking or monitoring computer of said designated official vehicle and said on-board computer having a capability to transfer data between each other, and further wherein said system can at least one of establish, read, change and register in accordance with data representative of said motor vehicle; and wherein said on-board computer, said central computer, said licensing bureau computer and said reading means are coupled with one another in such a manner that an alarm is triggered in said computers by one of said data carriers which is incorrectly coded in comparison with stored data.

2. The arrangement of claim 1, wherein said reading means is configured as a feed-through reader.

* * * * *